(12) United States Patent
Andrews

(10) Patent No.: US 11,031,904 B2
(45) Date of Patent: Jun. 8, 2021

(54) GROUNDING CLAMPS

(71) Applicant: A.K. Stamping Company, Inc., Mountainside, NJ (US)

(72) Inventor: Mark Andrews, Wharton, NJ (US)

(73) Assignee: A.K. STAMPING COMPANY, INC., Mountainside, NJ (US)

( * ) Notice: Subject to any disclaimer, the term of this patent is extended or adjusted under 35 U.S.C. 154(b) by 0 days.

(21) Appl. No.: 14/966,420

(22) Filed: Dec. 11, 2015

(65) Prior Publication Data

US 2016/0173028 A1  Jun. 16, 2016

Related U.S. Application Data

(60) Provisional application No. 62/090,862, filed on Dec. 11, 2014.

(51) Int. Cl.
| | |
|---|---|
| *H01L 31/042* | (2014.01) |
| *H02N 6/00* | (2006.01) |
| *H02S 40/34* | (2014.01) |
| *H01R 4/64* | (2006.01) |
| *H01R 4/26* | (2006.01) |
| *H01R 4/44* | (2006.01) |

(52) U.S. Cl.
CPC ............ *H02S 40/34* (2014.12); *H01R 4/26* (2013.01); *H01R 4/44* (2013.01); *H01R 4/64* (2013.01)

(58) Field of Classification Search
CPC .......... H02S 20/20; H02S 30/10; H02S 40/34; H02S 40/36; H01R 4/44; H01R 4/42; H01R 4/28; H01R 4/64
USPC ........................................................ 439/108
See application file for complete search history.

(56) References Cited

U.S. PATENT DOCUMENTS

| | | | |
|---|---|---|---|
| 1,489,835 | A | 4/1924 | Heinrich |
| 2,720,135 | A | 10/1955 | Gisondi |
| 3,486,158 | A | 12/1969 | Soltysik |
| 3,509,517 | A | 4/1970 | Gutshall |
| 3,609,653 | A | 9/1971 | Wallo |
| 3,609,654 | A | 9/1971 | Wallo |
| 3,869,760 | A | 3/1975 | Meyer |
| 4,040,700 | A | 8/1977 | Obuch |
| 4,502,743 | A | 3/1985 | Ziegler |
| 4,561,708 | A | 12/1985 | Sorlien et al. |

(Continued)

FOREIGN PATENT DOCUMENTS

| | | |
|---|---|---|
| DE | 202012101815 U1 | 8/2013 |
| DE | 202014106301 U1 | 4/2015 |

(Continued)

OTHER PUBLICATIONS

The Free Dictionary. "Definition of 'To bear against'." https://www.thefreedictionary.com/To+bear+against. Accessed online Jun. 3, 2020. (Year: 2020).*

(Continued)

*Primary Examiner* — Angelo Trivisonno
(74) *Attorney, Agent, or Firm* — McCarter & English, LLP

(57) ABSTRACT

A grounding clamp is provided. The grounding clamp comprises a body portion having first and second sides, first and second fingers extending from the first side of the body portion, a first set of teeth extending from the first side of the body portion, the first set of teeth positioned between the first and second fingers, and a second set of teeth extending from the second side of the body portion.

10 Claims, 9 Drawing Sheets

(56) References Cited

U.S. PATENT DOCUMENTS

| | | | |
|---|---|---|---|
| 4,604,888 A | | 8/1986 | Mayszak |
| 5,013,872 A | | 5/1991 | Lockwood et al. |
| 5,151,560 A | * | 9/1992 | Kreinberg ............... H01R 4/64 |
| | | | 174/78 |
| 5,164,545 A | | 11/1992 | Kreinberg et al. |
| D350,474 S | | 9/1994 | Asami |
| 5,358,423 A | | 10/1994 | Burkhard et al. |
| 5,722,124 A | | 3/1998 | Wisniewski |
| 5,759,004 A | | 6/1998 | Kuffel |
| 5,919,019 A | | 7/1999 | Fischer |
| 6,106,310 A | * | 8/2000 | Davis ..................... H01R 4/26 |
| | | | 439/92 |
| 6,706,970 B2 | | 3/2004 | Laub et al. |
| 6,908,274 B1 | | 6/2005 | Vassiliou |
| 6,986,673 B2 | | 1/2006 | de la Borbolla |
| 7,086,125 B2 | | 8/2006 | Slobodecki et al. |
| 7,686,625 B1 | * | 3/2010 | Dyer ..................... H01R 4/64 |
| | | | 439/857 |
| 8,016,530 B2 | | 9/2011 | Johnson et al. |
| 8,344,239 B2 | | 1/2013 | Plaisted |
| 8,505,864 B1 | | 8/2013 | Taylor et al. |
| 8,572,909 B2 | | 11/2013 | Rivera et al. |
| 8,800,120 B2 | | 8/2014 | Benedetti |
| 9,166,522 B1 | | 10/2015 | Zvanut et al. |
| 9,457,734 B2 | | 10/2016 | Smith et al. |
| 9,472,866 B1 | | 10/2016 | Seelig |
| 9,689,411 B2 | | 6/2017 | Meine et al. |
| 9,893,436 B2 | | 2/2018 | Martin |
| 9,985,361 B2 | | 5/2018 | Martin |
| 10,270,188 B2 | | 4/2019 | Martin |
| 2004/0049894 A1 | | 3/2004 | Jackson et al. |
| 2005/0236861 A1 | | 10/2005 | Slobodecki et al. |
| 2007/0212935 A1 | * | 9/2007 | Lenox ..................... H01R 4/64 |
| | | | 439/567 |
| 2008/0053517 A1 | * | 3/2008 | Plaisted ................. H02S 20/23 |
| | | | 136/251 |
| 2008/0086850 A1 | | 4/2008 | Smith et al. |
| 2010/0146899 A1 | * | 6/2010 | Zante ..................... F24J 2/5205 |
| | | | 52/584.1 |
| 2010/0276558 A1 | | 11/2010 | Faust et al. |
| 2011/0151703 A1 | * | 6/2011 | Parker ..................... H01R 4/36 |
| | | | 439/338 |
| 2011/0260027 A1 | | 10/2011 | Farnham, Jr. |
| 2011/0265860 A1 | * | 11/2011 | Ciasulli ................. F24J 2/5252 |
| | | | 136/251 |
| 2012/0192925 A1 | * | 8/2012 | Grushkowitz ............ F16L 3/24 |
| | | | 136/251 |
| 2012/0244729 A1 | | 9/2012 | Rivera et al. |
| 2012/0304556 A1 | * | 12/2012 | Teller ..................... F24S 25/615 |
| | | | 52/173.1 |
| 2013/0048056 A1 | * | 2/2013 | Kilgore ................. H02S 20/24 |
| | | | 136/251 |
| 2013/0109249 A1 | * | 5/2013 | Roth ....................... H01R 4/26 |
| | | | 439/816 |
| 2013/0200245 A1 | | 8/2013 | Markiewicz et al. |
| 2013/0263917 A1 | | 10/2013 | Hamamura |
| 2013/0340811 A1 | | 12/2013 | Danning et al. |
| 2014/0010616 A1 | | 1/2014 | Meine et al. |
| 2014/0134855 A1 | | 5/2014 | Kolbe et al. |
| 2016/0006390 A1 | | 1/2016 | Cinnamon et al. |
| 2016/0372842 A1 | * | 12/2016 | Martin ..................... H01R 4/26 |
| 2017/0170579 A1 | | 6/2017 | Martin |
| 2017/0179621 A1 | | 6/2017 | Martin |
| 2018/0316307 A1 | | 11/2018 | Martin |
| 2020/0162020 A1 | | 5/2020 | Andrews |

FOREIGN PATENT DOCUMENTS

| | | |
|---|---|---|
| EP | 0669470 A1 | 8/1995 |
| EP | 1138962 A2 | 10/2001 |
| EP | 1398850 A1 | 3/2004 |
| EP | 2453527 A1 | 5/2012 |
| EP | 26575423 A2 | 10/2013 |
| WO | 2016/205817 A1 | 12/2016 |
| WO | 2018/204137 A1 | 11/2018 |

OTHER PUBLICATIONS

Webster's Online Dictionary. "Definition of 'To bear against'." www.webster-dictionary.org/definition/To+bear+against. Accessed online Jun. 3, 2020. (Year: 2020).*
International Search Report of the International Searching Authority dated Apr. 19, 2016, issued in connection with International Application No. PCT/US15/65243 (5 pages).
Written Opinion of the International Searching Authority dated Apr. 19, 2016, issued in connection with International Application No. PCT/US15/65243 (5 pages).
Intertek Listing Constructional Data Report, GameChange Racking, LLC, issued Mar. 30, 2014 (16 pages).
Office Action dated Dec. 12, 2017, issued in connection with U.S. Appl. No. 15/532,188 (17 pages).
Office Action dated May 17, 2019, issued in connection with U.S. Appl. No. 15/532,188 (9 pages).
Notice of Non-Responsive Amendment dated Nov. 22, 2019, issued in connection with U.S. Appl. No. 15/532,188 (6 pages).
Notice of Abandonment dated Mar. 31, 2020, issued in connection with U.S. Appl. No. 15/532,188 (2 pages).
Office Action dated Apr. 1, 2020, issued in connection with U.S. Appl. No. 16/749,487 (12 pages).
Notice of Allowance dated Sep. 14, 2020, issued in connection with U.S. Appl. No. 16/749,487 (8 pages).

* cited by examiner

GROUNDING CLAMPS

CROSS-REFERENCE TO RELATED APPLICATIONS

This application claims priority to U.S. Provisional Patent Application No. 62/090,862, filed on Dec. 11, 2014, the entire disclosure of which is expressly incorporated herein by reference.

BACKGROUND

Field of the Disclosure

The present disclosure relates generally to grounding clamps for making electrical connection between metal pieces that are mechanically joined together.

Related Art

Solar panels are becoming an increasingly popular energy alternative. Solar panel frames, and the mounting rails to which they are fastened, can be made of aluminum. However, the solar panel frames normally have anodized surface treatment, which insulates the surface from electrical continuity. As a result, the solar panels may not be electrically grounded to the mounting rail. Accordingly, there exists a need in the art for fastening and grounding solar panels with mounting rails.

SUMMARY

The present disclosure relates to grounding clamps. More specifically, the present disclosure relates to grounding clamps having a plurality of teeth at more than one location for mechanically securing and electrically connecting one or more solar panel frames to each other and to at least one mounting rail.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a grounding clamp, as discussed in detail below.

Figure 1:
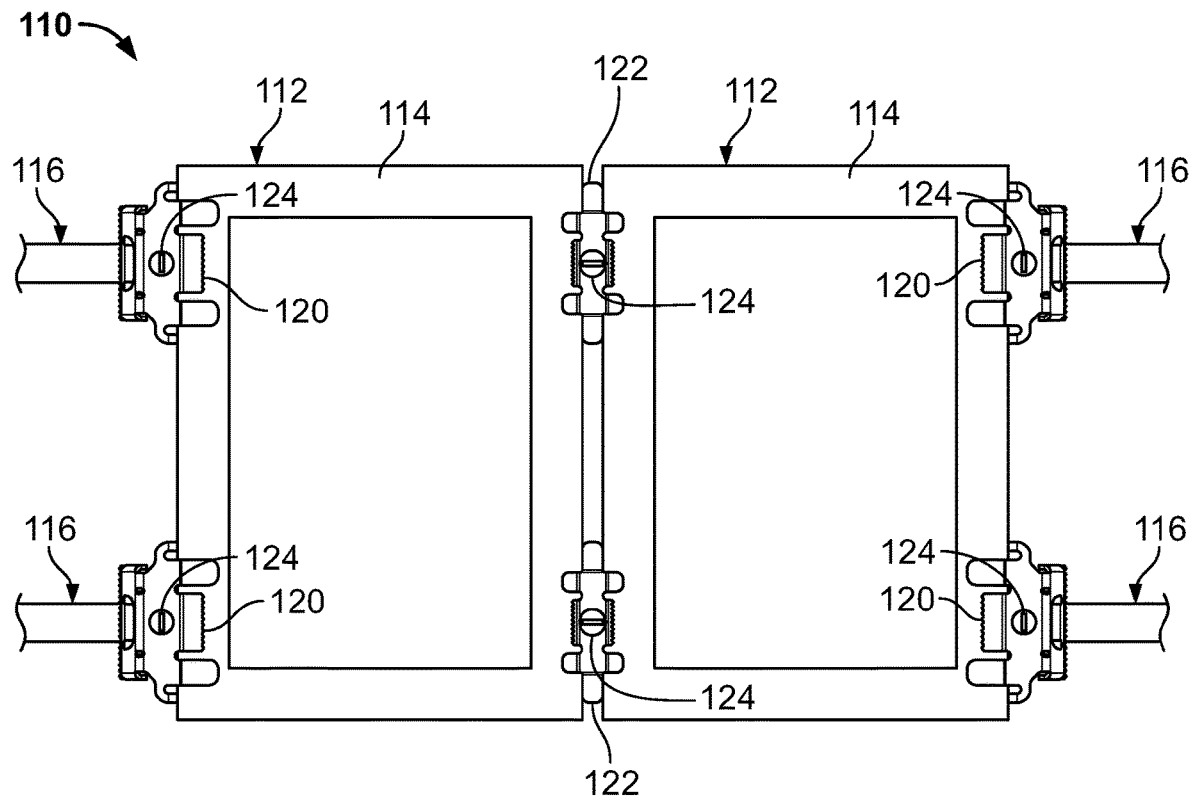
FIG. 1 is a top view of a solar panel assembly utilizing grounding clamps of the present disclosure.
Figure 2:
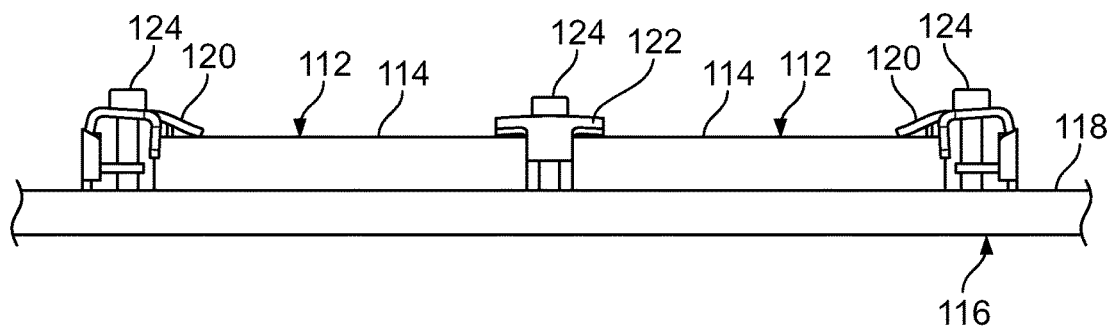
FIG. 2 is a side view of the solar panel assembly of FIG. 1.

FIGS. 1-2 are views of a solar panel assembly 110 utilizing grounding clamps of the present disclosure. More specifically, FIG. 1 is a top view of a solar panel assembly 110. As shown, the solar panel assembly 110 includes one or more solar panels 112 with an extruded aluminum frame 114 (which could have a hardness of, for example, T6 surface hardness), mounting rails 116 (guard rails), end grounding clamps 120, intermediate grounding clamps 122, and bolts 124. The solar panels 112 are positioned adjacent to one another, and each solar panel 112 is secured to at least one mounting rail 116 using the grounding clamps 120, 122 and bolts 124.

The grounding clamps 120, 122 could be made of 300 series stainless steel with a temper, for example, of ½ hardness. However, the material and hardness of the grounding clamps 120, 122 could vary depending on such factors as the material and hardness of the solar panel frame 114 and mounting rails 116. The grounding clamps 120, 122 could be manufactured from a single sheet of metal. It is noted that although the grounding clamps 120, 122 are used in a solar panel assembly 110, the grounding clamps 120, 122 could be used in any variety of applications, where mechanical and electrical contact between two materials is desired.

FIG. 2 is a side view of the solar panel assembly 110. As shown, the end grounding clamps 120 provide a grounding connection between the top surface of the frame 114 of the solar panels 112 and the mounting rail 116. Comparatively, the intermediate grounding clamps 122 provide a mechanical and electrical connection between the solar panels 112 (e.g., between a first solar panel and a second solar panel adjacent thereto).

Figure 3:
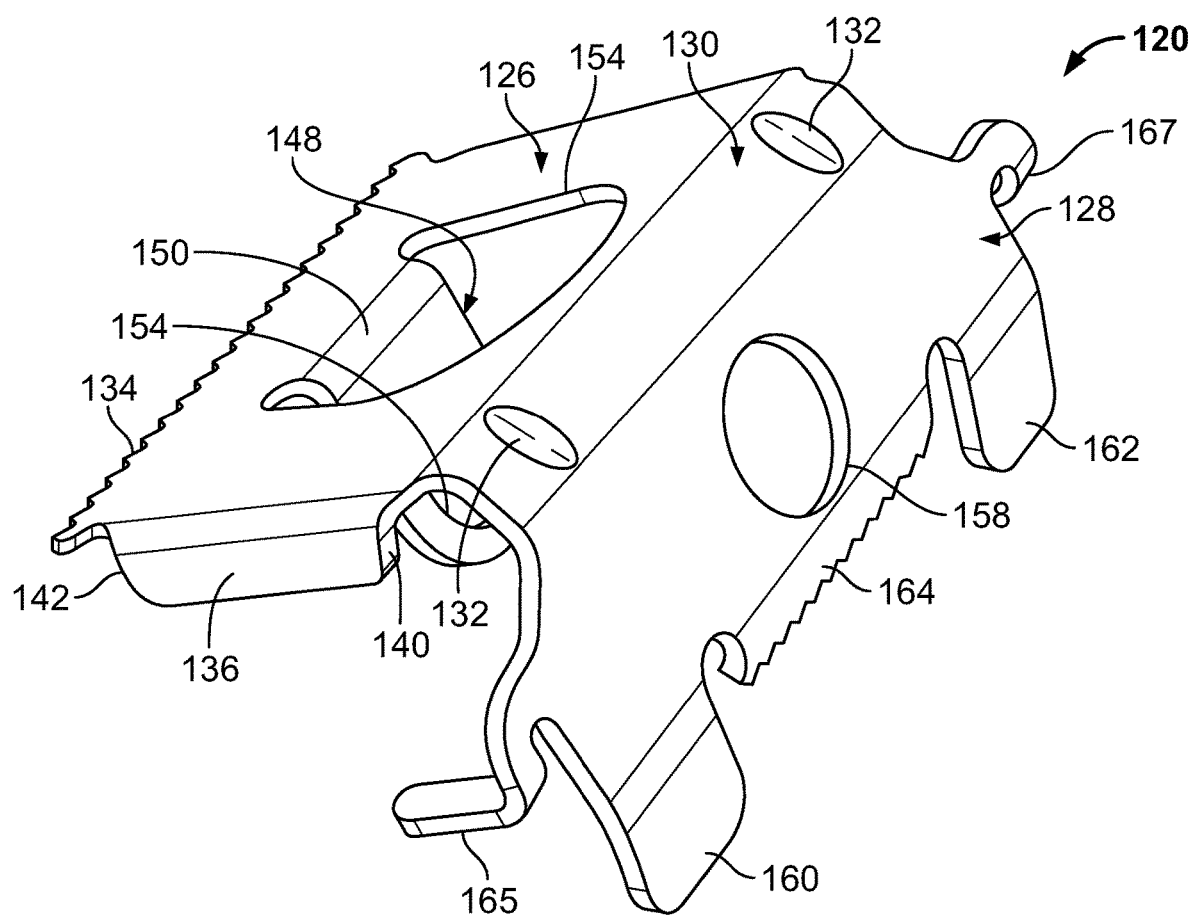
FIG. 3 is a top perspective view of an end grounding clamp.
Figure 4:
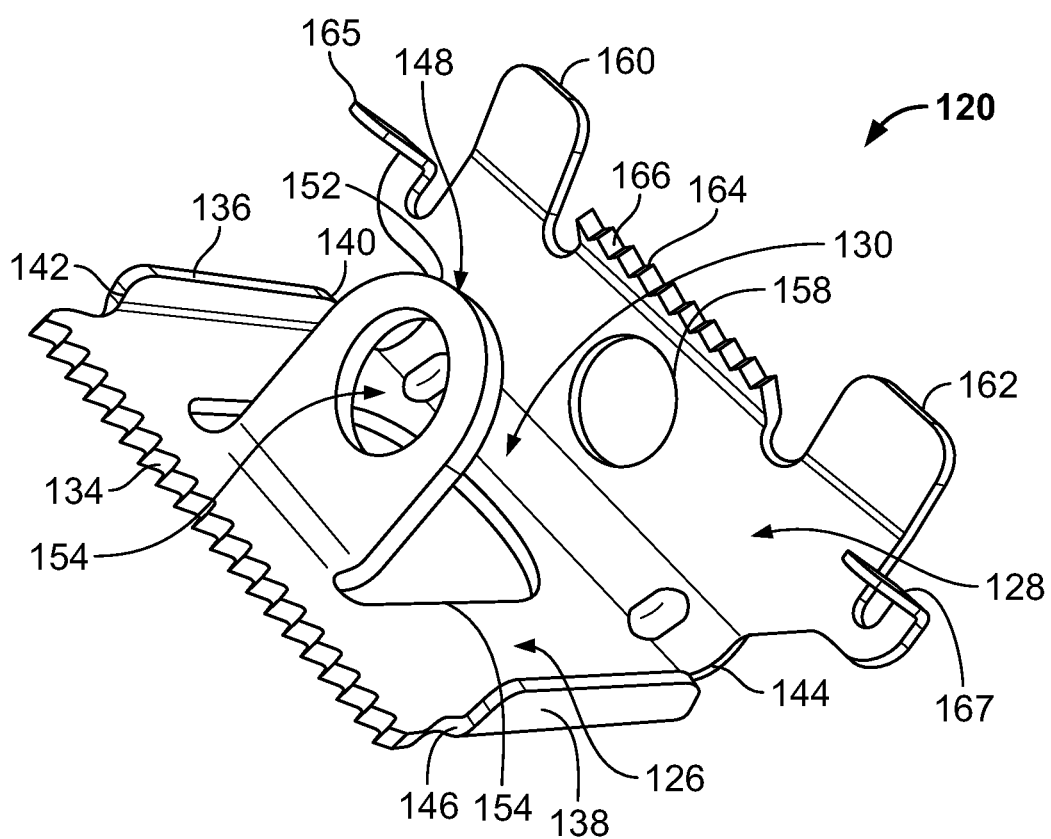
FIG. 4 is a bottom perspective view of the end grounding clamp of FIG. 3.
Figure 5:
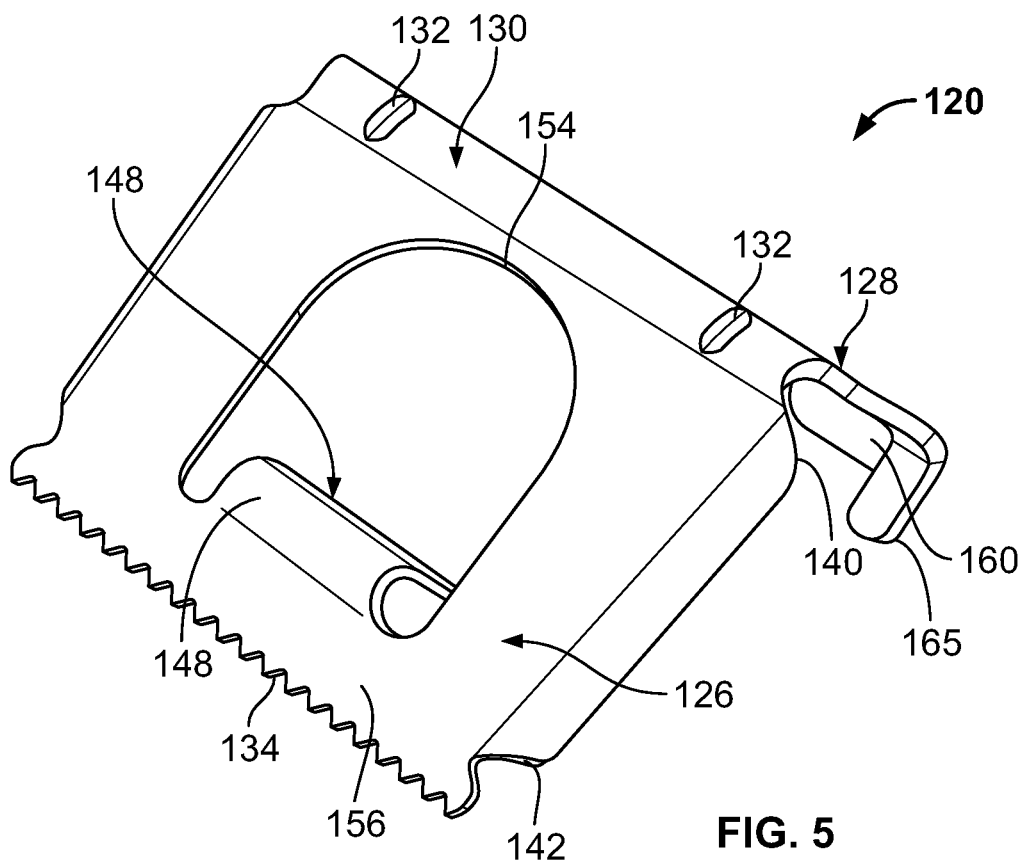
FIG. 5 is a forward perspective view of the end grounding clamp of FIG. 3.
Figure 6:
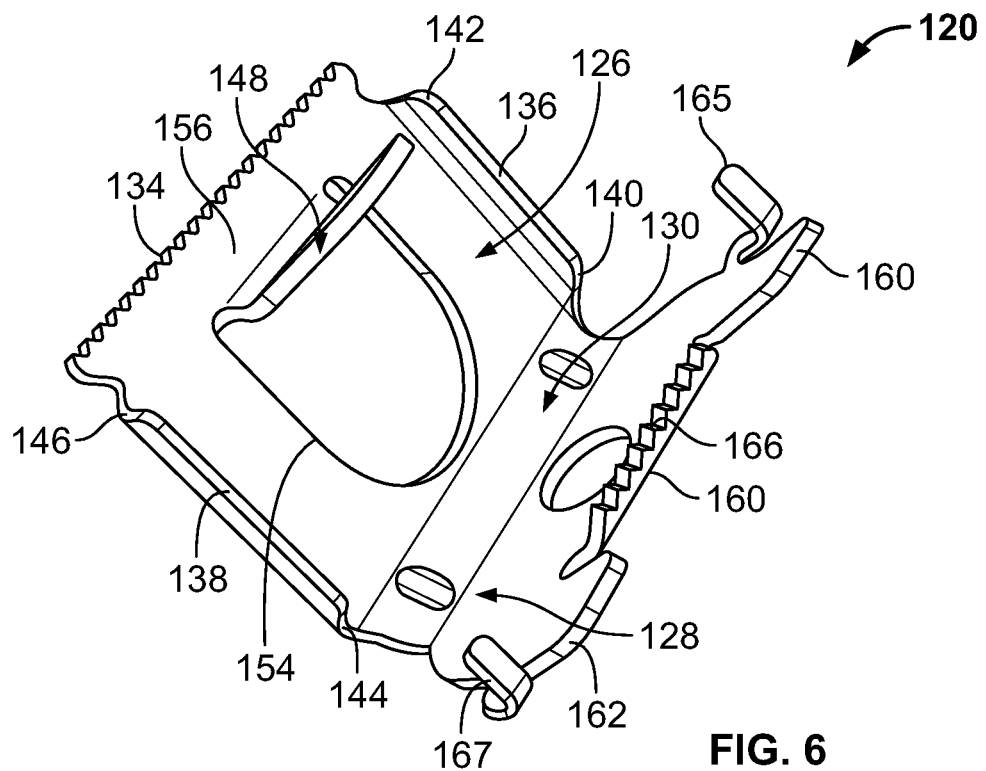
FIG. 6 is a back perspective view of the end grounding clamp of FIG. 3.

FIGS. 3-6 are views of an end grounding clamp 120. More specifically, FIG. 3 is a top perspective view of an end grounding clamp 120, FIG. 4 is a bottom perspective view of the end grounding clamp 120 of FIG. 3, FIG. 5 is a forward perspective view of the end grounding clamp 120 of FIG. 3, and FIG. 6 is a back perspective view of the end grounding clamp 120 of FIG. 3.

With reference to FIGS. 3-6, the end grounding clamp 120 could of a single sheet construction manufactured with a series of stamps and bends. The end grounding clamp 120 comprises a vertical wall 126 and a top wall 128 (e.g., body portion having a vertical wall 126 and top wall 128) extending therefrom, such that the vertical wall 126 and top wall 128 are generally perpendicularly to one another with a bend 130 formed therebetween. The bend 130 could have one or more stiffening gussets 132 formed therein to strengthen the bend 130 (e.g., to provide additional structural strength).

The vertical wall 126 comprises a plurality of teeth 134 extending from a bottom thereof (opposite the top wall 128) for penetrating and engaging a mounting rail. The vertical wall 126 includes a first sidewall 136 bent and extending back from a first side (e.g., left side) of the vertical wall 126, and a second sidewall 138 bent and extending back (generally perpendicularly) from a second side (e.g., right side) of the vertical wall 126. The sidewalls 136, 138 could be of any depth and could extend for a portion (or all) of the height of the vertical wall 126 (e.g., from the bottom surface of the vertical wall 126). For example, the first sidewall 136 could be centrally positioned along the vertical wall 126 and could include a first top taper 140 and a first bottom taper 142. Similarly, the second sidewall 138 could include a second top taper 144 and a second bottom taper 146. These sidewalls 136, 138 could strengthen the vertical wall 126, thereby preventing buckling or bending thereof.

The vertical wall 126 could include a tab 148 having a base 150 integrally joined with (e.g., bent from) the vertical wall 126 with a rounded end 152 opposite the base 150. The tab 148 could extend back (e.g., in the same direction as the top wall 128), such that the tab 148 is generally perpendicular to the vertical wall 126. The tab 148 includes an aperture 154 at or proximate to the rounded end 152.

In forming the tab 148 of the grounding clamp 120, a first stamp could remove material, such that the vertical wall 126 and the tab 148 are in the same plane and define an arced aperture (e.g., U-shaped aperture) therebetween. The tab 148 could then be bent, such that the vertical wall 126 and the tab 148 are in different planes (e.g., perpendicular planes) and the vertical wall defines an archway aperture 154 therethrough. The archway aperture 154 and tab 148 could be any of a variety of shapes. A bottom portion 156 between the archway aperture 154 and the teeth 134 could be of any length depending on the height of the solar panel frame with which the clamp is designed for use.

The top wall 128 could define a through hole 158, where the through hole 158 could be centrally located and in vertical alignment with the through hole 154 of the tab 148. The vertical alignment allows a bolt to go through both of the through holes 154, 158. This aligns the end ground clamp 120 and prevents twisting thereof when assembled (e.g., with a mounting rail).

The top wall 128 could further include a first finger 160 disposed to the first side and extending back (away from the bend 130) and downwardly at an angle relative to the top wall 128. The top wall 128 could also include a second finger 162 disposed to the second side and extending back (away from the bend 130) and downwardly at an angle relative to the top wall 128. The first and second fingers 160, 162 contact a top surface of a solar panel frame to keep the solar panel frame in place. The angles of the first finger 160 and second finger 162 could be the same.

The top wall 128 could further include a first standoff 165 at the first side of the top wall 128 extending back (away from the bend 130) and downwardly (e.g., substantially perpendicularly) relative to the top wall 128. The top wall 128 could further include a second standoff 167 at a second side of the top wall 128 extending back (away from the bend 130) and downwardly (e.g., substantially perpendicularly) relative to the top wall 128. The standoffs 165, 167 contact a side surface of a solar panel frame. The standoffs 165, 167 further assist in installation of the grounding clamp 120 (e.g., vertically aligning the end grounding panel clamp 120) and create space between the vertical wall 126 and tab 148 of the grounding clamp 120 and a side of a solar panel frame.

The top wall 128 could further include a back extending central portion 164 disposed between the first finger 160 and second finger 162, the central portion 164 extending back (away from the bend 130) and downwardly from the top wall 128. The central portion 164 could be bent (e.g., 45°), angled, rolled, or curved relative to the top wall 128. The back extending central portion 164 could include a plurality of teeth 166 extending from the end thereof (e.g., away from the body portion) for penetrating and engaging a solar panel frame. Placing the plurality of teeth 166 at an angle provides for better penetration of the teeth 166 because a single point of each tooth (e.g., defined by the sides of the tooth 166 and the bottom surface of the top wall 128) contact and penetrate the solar panel frame (as opposed to the edge formed by the sides of the teeth 166).

The angles and/or lengths of the fingers 160, 162 and central portion 164 could vary depending on size and characteristics of the panels and mounting rails (e.g., the central portion 164 could be shorter in length than the fingers 160, 162). In this way, at least a portion of the teeth 166 of the central portion 164 penetrate a solar panel frame.

Figure 7:
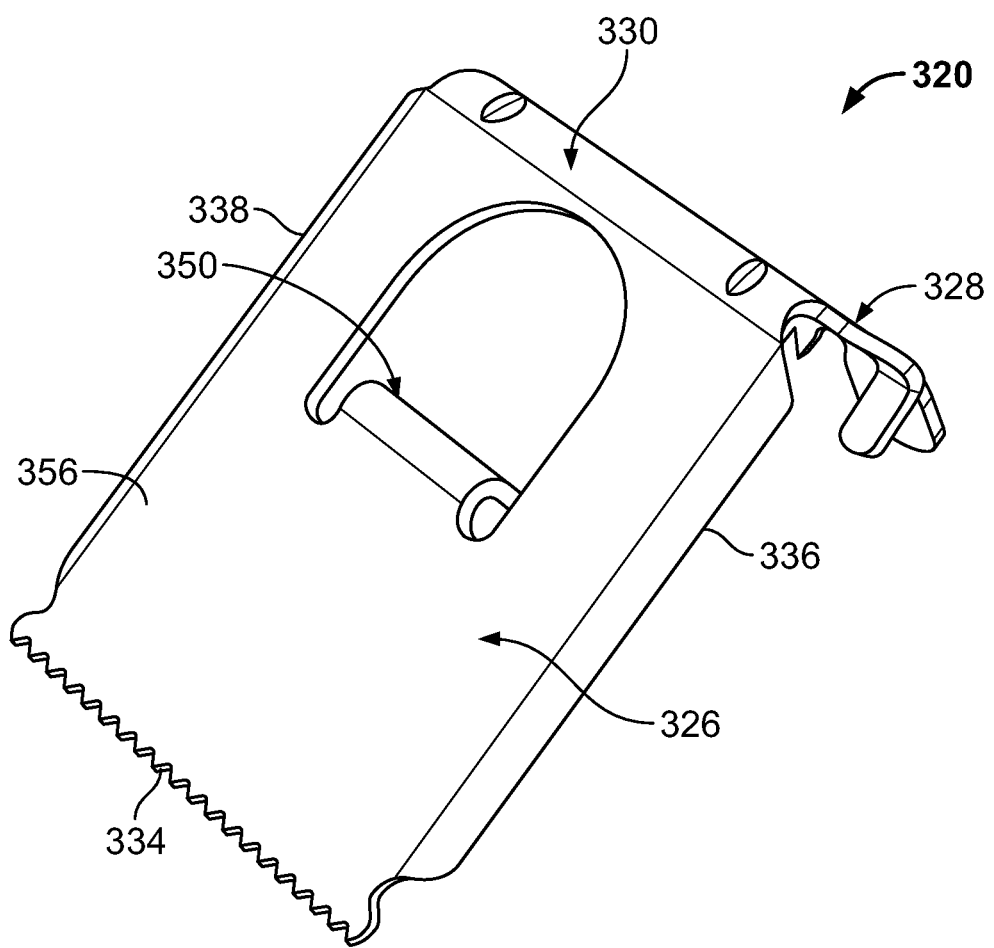
FIG. 7 is a forward perspective view of another end grounding clamp with an extended bottom portion.

FIG. 7 is a back perspective view of another end grounding clamp 320 with an extended bottom portion 356. Similarly to the grounding clamp of FIGS. 3-6, the grounding clamp 320 includes a vertical wall 326 with sidewalls 336, 338, a tab 350 with a through hole, and a plurality of teeth 334, as well as a top wall 328 integrally connected with the vertical wall by a bend 330, the top wall 328 including a through hole, first and second fingers, first and second standoffs, and a central portion having a plurality of teeth disposed between the fingers. The length of the extended bottom portion 356 of the grounding clamp 320 could vary depending on the height of the solar panel frame (e.g., a thicker solar panel frame requires a taller grounding clamp).

Figure 8:
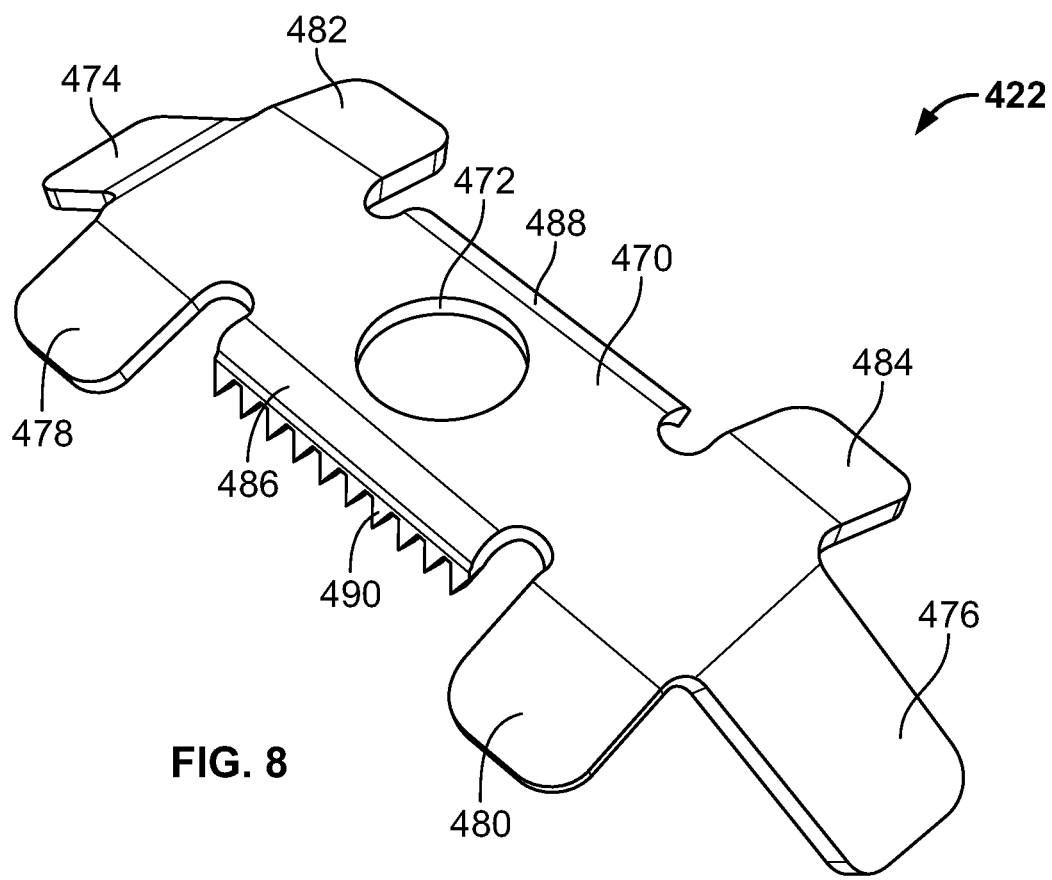
FIG. 8 is a top perspective view of an intermediate grounding clamp.
Figure 9:
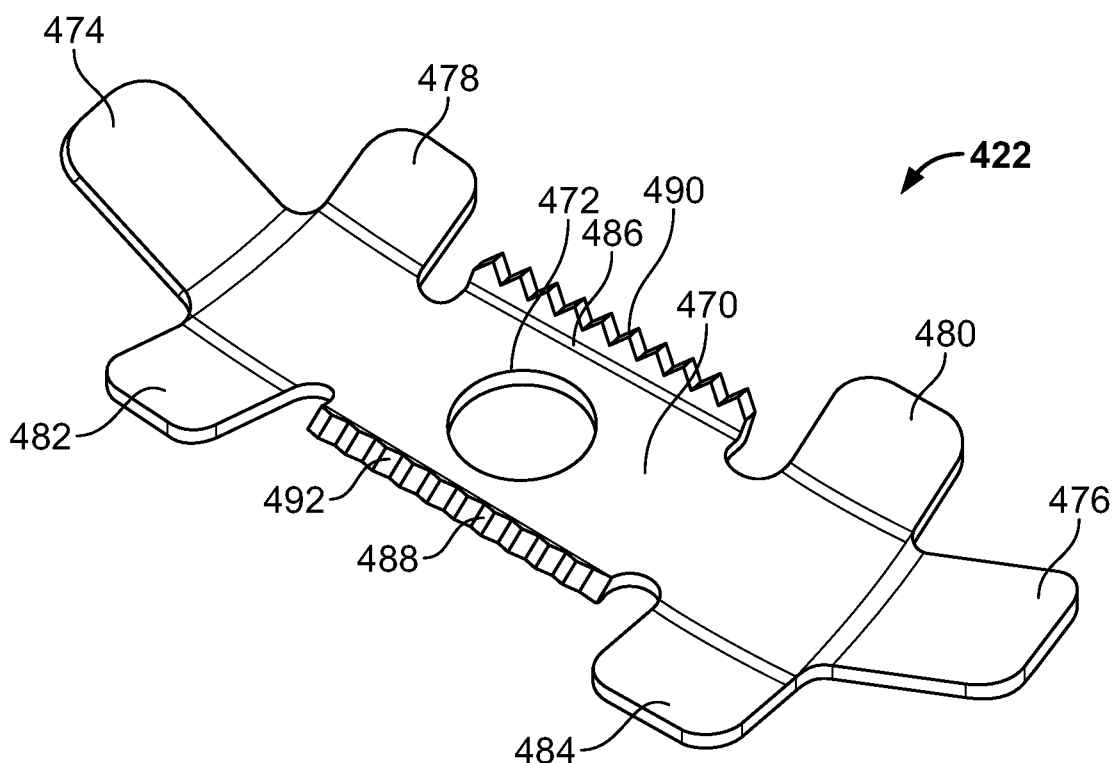
FIG. 9 is a bottom perspective view of the intermediate grounding clamp of FIG. 8.

FIGS. 8-9 are views of an intermediate grounding clamp 422. More specifically, FIG. 8 is a top perspective view of an intermediate grounding clamp 422, and FIG. 9 is a bottom perspective view of the intermediate grounding clamp 422 of FIG. 8. The intermediate grounding clamp 422 includes a body portion 470 with a through hole 472 therein (e.g., centrally located in the body portion 470). The body portion 470 includes a first spacer 474 extending from a first side of the grounding clamp 422 downwardly (towards the bottom surface) at an angle relative to the body portion 470, as well as a second spacer 476 extending from a second side (opposite the direction of the first spacer 474) of the grounding clamp 422 downwardly at an angle relative to the body portion 470. The angles of the first spacer 474 and second spacer 476 could be the same. The width of the spacers 474, 476 could vary depending on the desired spacing between the solar panels.

Further, the grounding clamp 422 includes a plurality of fingers. More specifically, the grounding clamp 422 includes a first forwardly extending finger 478 disposed towards the first side of the grounding clamp 422 and extending downwardly at an angle relative to the body portion 470, and a second forwardly extending finger 480 disposed towards the second side of the grounding clamp 422 and extending downwardly at an angle relative to the body portion 470, such that the first and second forwardly extending fingers 478, 480 extend in the same direction. The grounding clamp 422 further includes a first back extending finger 482 disposed towards the first side of the grounding clamp 422 and extending downwardly at an angle relative to the body portion 470, and a second back extending finger 484 disposed towards the second side of the grounding clamp 422 and extending downwardly at an angle relative to the body portion 470, such that the first and second back extending fingers 482, 484 extend in the same direction. The forwardly extending fingers 478, 480 extending from an opposite side of the intermediate grounding clamp 422 as the back extending fingers 482, 484. The fingers 478, 480, 482, 484 could be of the same length and/or width, and could be longer or shorter than the spacers 474, 476. The angles of the fingers 478, 480, 482, 484 could be the same, and/or could be greater or less than the angles of the spacers 474, 476. The first forwardly extending finger 478 and first back extending finger 482 could be adjacent each other and could extend from the body 470 at perpendicular directions. Similarly, the second forwardly extending finger 480 and second back extending finger 484 could be adjacent each other and could extend from the body 470 at perpendicular directions.

The grounding clamp 422 could further include a forwardly extending central portion 486 disposed between the first and second forwardly extending fingers 478, 480 and extending downwardly at an angle relative to the body portion 470. Similarly, the grounding clamp 422 could further include a back extending central portion 488 disposed between the first and second back extending fingers 482, 484 and extending downwardly at an angle relative to the body portion 470. The central portions 486, 488 could be bent, angled, rolled, or curved relative to the body portion 470. The central portions 486, 488 could be of the same length and/or width. The angles of the central portions 486, 488 could be the same. The angles and/or lengths of the spacers 474, 476, fingers 478, 480, 482, 484, and/or central portions 486, 488 could vary depending on size and characteristics of the panels and mounting rails (e.g., the central portions 486, 488 could be shorter in length than the fingers 478, 480, 482, 484).

The forwardly extending central portion 486 could include a first plurality of teeth 490 extending from the end thereof (e.g., away from the body portion 470) for penetrating and engaging a solar panel frame, and the back extending central portion 488 could include a second plurality of teeth 492 extending from the end thereof (e.g., away from the body portion 470) for penetrating and engaging a solar panel frame. Placing the plurality of teeth 490, 492 at an angle provides for better penetration of the teeth 490, 492 because a single point of each tooth (e.g., defined by the sides of the tooth 490, 492 and the bottom surface of the intermediate grounding clamp 422) contacts and penetrates the solar panel frame (as opposed to the edge formed by the sides of the teeth 490, 492). In this way, at least a portion of the teeth 490, 492 of the central portions 486, 488 penetrates a solar panel frame. More specifically, the first plurality of teeth 490 of the forwardly extending central portion 486 penetrates and engages a first solar panel frame, and the second plurality of teeth 492 of the back extending central portion 488 penetrates and engages a second solar panel frame, thereby mechanically and electrically connecting the first and second solar panel frames to one another.

Figure 10:
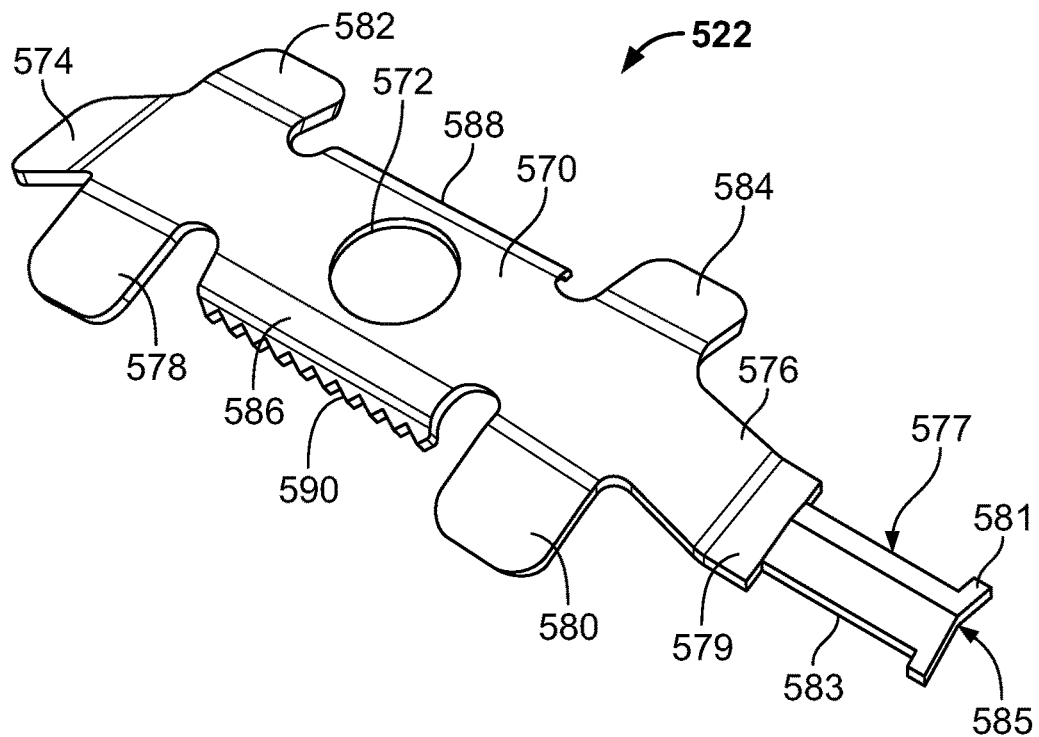
FIG. 10 is a perspective view of another intermediate grounding clamp with a fastener extension.
Figure 11:
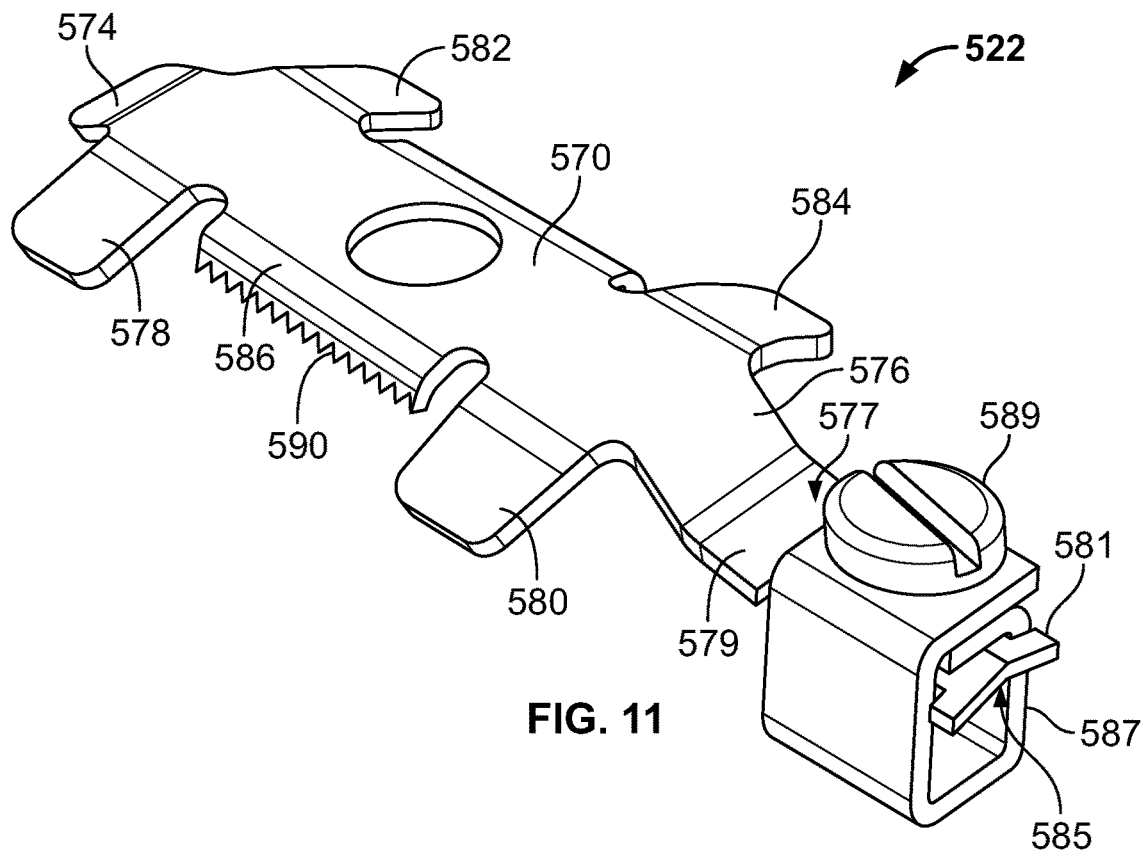
FIG. 11 is a perspective view of the grounding clamp of FIG. 10 with a wire clamp assembled thereto.

FIGS. 10-11 are views of an intermediate grounding clamp 522. More specifically, FIG. 10 is a top perspective view of an intermediate grounding clamp 522 with a fastener extension, and FIG. 11 is a bottom perspective view of the intermediate grounding clamp 522 of FIG. 10. As described above, the intermediate grounding clamp 522 includes a body portion 570 with a through hole 572, a first spacer 574, a second spacer 576, a first forwardly extending finger 578, a second forwardly extending finger 580, a first back extending finger 582 a second back extending finger 584, a forwardly extending central portion 586 with a first plurality of teeth 590, and a back extending central portion 588 with a second plurality of teeth.

The second spacer 576 further includes a fastener extension 577 protruding from an end thereof (away from the body portion 570), and at an angle such that the fastener extension 577 is substantially parallel with the body portion 570. The fastener extension 577 includes first end portion 579 integrally connected with and extending from the second spacer 576, and second end portion 581 opposite thereto. The first and second end portions 576, 581 could be of the same or substantially similar widths. In between the first and second end portions 579, 581 is a neck 583 (e.g., recessed portion), which has a width thinner than the width of first and second end portions 579, 581. The fastener extension 577 could be bent at an angle along the length thereof to define a channel 585 in the lower surface thereof.

As shown in FIG. 11, a wire clamp 587 (e.g., grounding wire clamp) could be positioned around the neck 583 of the fastener extension 577. The wire clamp 587 could be a loop of metal with at least one threaded through hole (e.g., a hole at each end of the strip of metal forming the loop) for a bolt 589 (e.g., screw). The wire clamp 587 could form a substantially rectangular loop. When the wire clamp 587 is positioned around the neck 583 of the grounding clamp 522, a grounding wire could be threaded through the wire clamp 587, and positioned beneath the fastener extension 577 (along the channel 587). Tightening the bolt 589 of the wire clamp 587 creates more distance between the top surface of the fastener extension 577 and the top of the wire clamp 587, which creates less distance between the bottom surface of the fastener extension 577 and the bottom of the wire clamp 587, thereby securing the grounding wire between the wire clamp 587 and the fastener extension 577. This keeps the grounding wire centered and secured.

Figure 12:
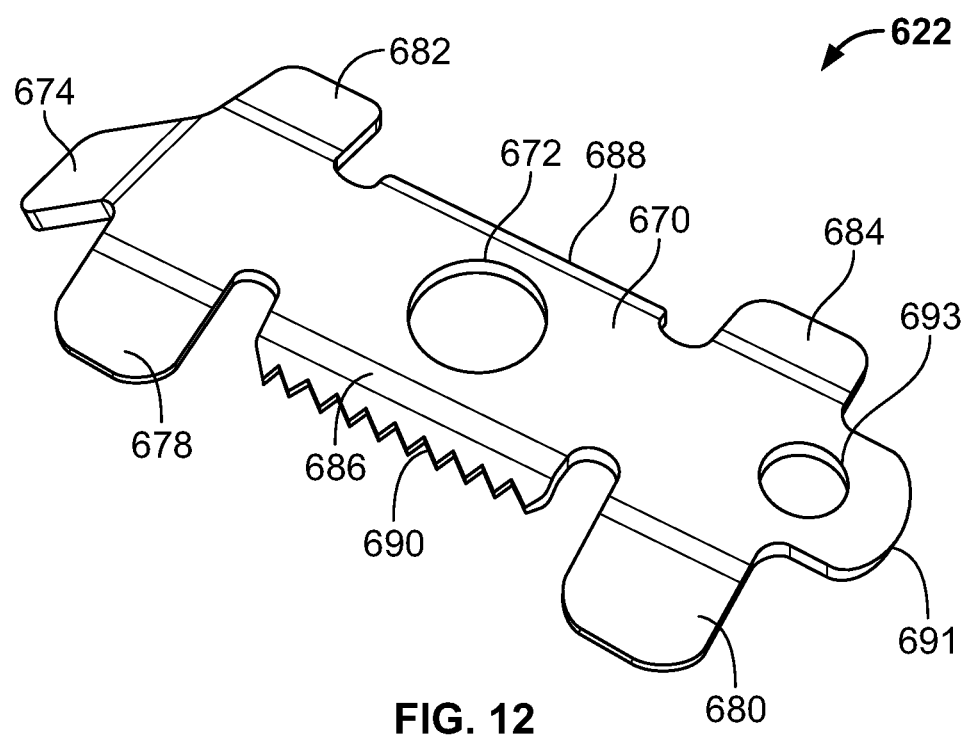
FIG. 12 is a perspective view of another intermediate grounding clamp with a grounding wire hole.

FIG. 12 is a perspective view of another intermediate grounding clamp 622 with a grounding wire hole. As described above, the intermediate grounding clamp 622 includes a body portion 670 with a through hole 672, a first spacer 674, a first forwardly extending finger 678, a second forwardly extending finger 680, a first back extending finger 682 a second back extending finger 684, a forwardly extending central portion 686 with a first plurality of teeth 690, and a back extending central portion 688 with a second plurality of teeth.

The intermediate grounding clamp 622 further includes a rounded end 691 extending from a second side (opposite the direction of the first spacer 574) of the grounding clamp 522. The rounded end 691 and body portion 670 define a grounding wire through hole 693 (e.g., threaded). A grounding wire can be threaded through the grounding wire through hole 693, which secures the grounding wire to the intermediate grounding clamp 622. A lay-in lug could be attached to the grounding wire through hole 693 (e.g., by a screw threaded into the grounding wire through hole 693).

Figure 13:
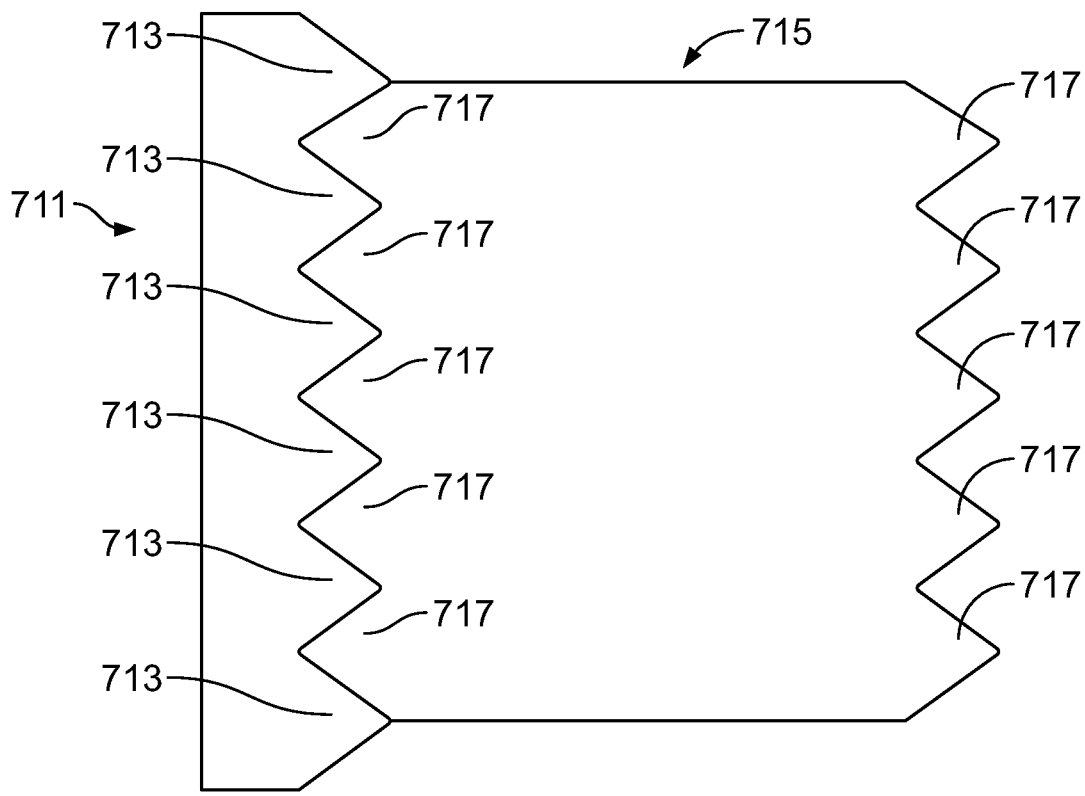
FIG. 13 is a view showing a first cut for forming teeth of a grounding clamp.
Figure 14:
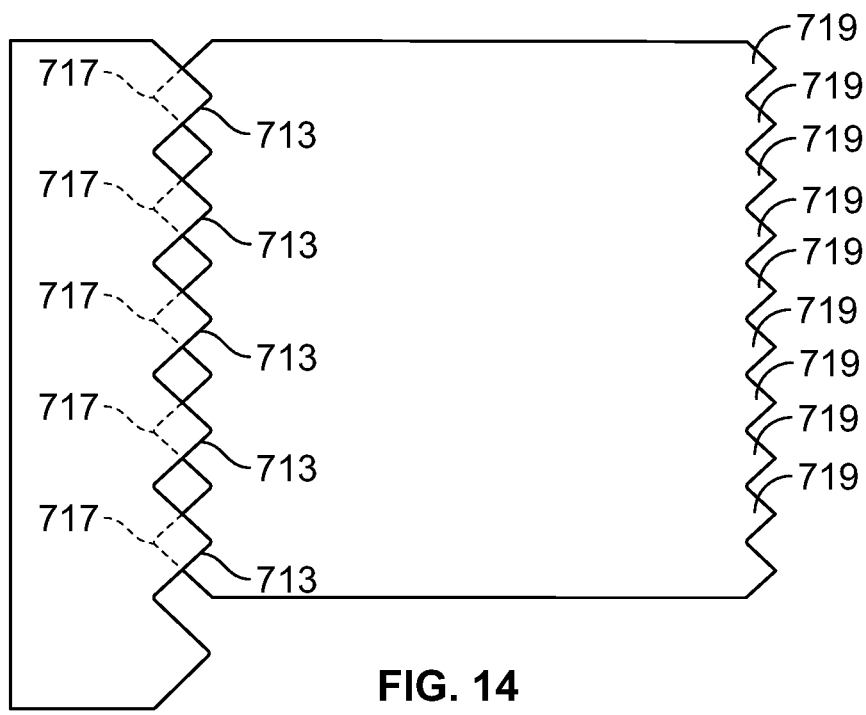
FIG. 14 is a view showing a second cut for forming teeth of the grounding clamp.

FIGS. 13-14 are views of a cutting tool 711 forming teeth using a cross cut. A cutting tool 711 has a plurality of cutting teeth 713. The peaks and valleys of the cutting teeth 713 may not be perfect points, and instead could be rounded to a degree (e.g., a limitation of their manufacturing process). To form teeth 717 from sheet metal 715 that are sharper than the cutting teeth 713 of the cutting tool 711, a cross cut could be used.

FIG. 13 is a view showing a first cut for forming teeth of a grounding clamp. Stamping using the cutting teeth 713 of cutting tool 711 forms a first set of teeth 717, which have the same (or substantially similar) properties (e.g., profile) as the cutting teeth 713. The first set of teeth 717 have similarly sharp peaks and valleys as those of the cutting teeth 713.

FIG. 14 is a view showing a second cut for forming teeth of the grounding clamp. More specifically, after forming the first set of teeth 717, the cutting tool 713 is shifted so that the cutting teeth 713 are positioned midway between the first set of teeth 717 (e.g., the peaks of the cutting teeth 713 are in line with the peaks of the first set of teeth 717). This produces a second set of teeth 719. The valleys of the second set of teeth 719 are similarly shaped as the valleys of cutting teeth 713, however, the peaks of the second set of teeth 719 are much sharper than that of cutting teeth 713. This is due to the fact that the peaks of the second set of teeth 719 are formed by the straight sides of the cutting teeth 713.

Having thus described the disclosure in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A solar panel assembly, comprising:
   a plurality of solar panels having respective solar panel frames;
   a plurality of mounting rails;
   one or more end grounding clamps including
      a first side body portion and a second side body portion coupled by a bend formed therebetween having at least one stiffening gusset formed therein such that the first side body portion and the second side body portion are perpendicular to one another,
      a first finger and a second finger, the first finger and the second finger extending away from the first side body portion such that the first finger and the second finger directly contact a top surface of a solar panel frame among the respective solar panel frames to maintain the solar panel frame in position,
      a first standoff and a second standoff, the first standoff and the second standoff extending perpendicularly from the first side body portion such that the first standoff and the second standoff directly contact a side surface of the solar panel frame among the respective solar panel frames,
      a first set of teeth and a second set of teeth, the first set of teeth having a plurality of teeth arranged adjacent to each other and extending at an angle from the first side body portion and positioned between the first finger and the second finger such that the first set of teeth penetrate at an acute angle with the top surface of the solar panel frame among the respective solar panel frames and the second set of teeth having a plurality of teeth arranged adjacent to each other and extending from the second side body portion in a same plane as the second side body portion, and generally perpendicular to the first side body portion, such that the second set of teeth penetrate one of the plurality of mounting rails, and
      a first through hole positioned in a center of the first side body portion and a tab extending from the second side body portion, the tab having an aperture being vertically aligned with the first through hole to receive a first bolt, the one or more end grounding clamps securing an end of the solar panel frame among the respective solar panel frames to the one or more mounting rails; and
   one or more intermediate grounding clamps including a third set of teeth and a fourth set of teeth and a second through hole to receive a second bolt, the one or more intermediate grounding clamps securing the respective solar panel frames to each other.

2. The solar panel assembly of claim 1, wherein the one or more intermediate grounding clamps is manufactured from a single sheet of metal.

3. The solar panel assembly of claim 1, wherein the one or more intermediate grounding clamps further comprise:
   a body portion having a first side and a second side;
   a first finger and a second finger extending from the first side of the body portion, the third set of teeth extending from the first side of the body portion, the third set of teeth positioned between the first finger and the second finger, and
   a third finger and a fourth finger extending from the second side of the body portion, the fourth set of teeth extending from the second side of the body portion, the fourth set of teeth positioned between the third finger and the fourth finger.

4. The solar panel assembly of claim 1, wherein the one or more intermediate grounding clamps include a second hole sized to receive a grounding wire therethrough.

5. The solar panel assembly of claim 3, wherein the intermediate clamp body portion further comprises a first end and a second end and a first spacer and a second spacer, the first spacer and the second spacer respectively extending from the first end and the second end.

6. The solar panel assembly of claim 5, wherein one of the first spacer and the second spacer includes a fastener extension extending from an end of the one of the first spacer and the second spacer, the fastener extension having a narrowed neck to receive a wire clamp.

7. The solar panel assembly of claim 1, wherein the one or more end grounding clamps are manufactured from a single sheet of metal.

8. The solar panel assembly of claim 1, wherein
   the first side body portion of the one or more end grounding clamps comprises a top wall portion and the second side body portion of the one or more end grounding clamps comprises a vertical wall portion, the vertical wall portion extending at an angle with respect to the top wall portion, and
   the first set of teeth extend from a first side of the top wall portion and are positioned between the first finger and the second finger, and the second set of teeth extend from a bottom of the vertical wall portion.

9. The solar panel assembly of claim 8, wherein the vertical wall portion comprises a first sidewall and a second sidewall respectively extending from opposing ends of the vertical wall portion.

10. The solar panel assembly of claim 8, wherein the vertical wall portion comprises the tab having the aperture, the tab extending at an angle from the vertical wall portion, the aperture of the tab vertically aligned with the first through hole, the first through hole being positioned within the top wall portion of the first side body portion of the one or more end grounding clamps.

* * * * *